United States Patent [19]

Hefer

[11] Patent Number: 5,644,075
[45] Date of Patent: Jul. 1, 1997

[54] WIND TUNNEL MODEL SUPPORT WITH VIBRATION DETECTION BALANCE AND COUNTERVIBRATION MEANS

[75] Inventor: Gerhard Hefer, Goettingen, Germany

[73] Assignee: European Transonic Windtunnel GmbH, Cologne, Germany

[21] Appl. No.: 622,379

[22] Filed: Mar. 27, 1996

[30] Foreign Application Priority Data

Apr. 7, 1995 [DE] Germany .................. 195 13 083.9

[51] Int. Cl.$^6$ .................. G01M 9/02; G01M 9/04
[52] U.S. Cl. .................. 73/147; 310/328
[58] Field of Search .................. 73/147; 310/316, 310/321, 328

[56] References Cited

U.S. PATENT DOCUMENTS

| | | | |
|---|---|---|---|
| 4,565,940 | 1/1986 | Hubbard, Jr. | 310/326 |
| 4,658,635 | 4/1987 | Pszolla et al. | 73/147 |
| 4,849,668 | 7/1989 | Crawley et al. | 310/328 |
| 4,938,059 | 7/1990 | Faucher et al. | |
| 4,940,914 | 7/1990 | Mizuno et al. | 310/326 |
| 5,525,853 | 6/1996 | Nye et al. | 310/316 |

FOREIGN PATENT DOCUMENTS 3151669  7/1983  Germany .

*Primary Examiner*—George M. Dombroske
*Assistant Examiner*—Joseph L. Felber
*Attorney, Agent, or Firm*—Loeb & Loeb LLP

[57] ABSTRACT

A support (11) for a wind tunnel model (10) has a sting (12) provided with a balance (16) carrying the model (10). On the basis of deformations of the balance (16), the wind forces acting on the model (10) can be measured. The balance (16) together with the model (10) forms a vibrating mass-spring system. For elimination of the vibrations, a counter vibration generator (15) is provided, arranged in serial arrangement with the balance (16).The counter vibration generator (15) is controlled, in dependence on signals of the balance (16) or other sensors describing the movements of the model (10), to cause counter vibrations for compensating the natural vibrations of the model (10).

2 Claims, 2 Drawing Sheets

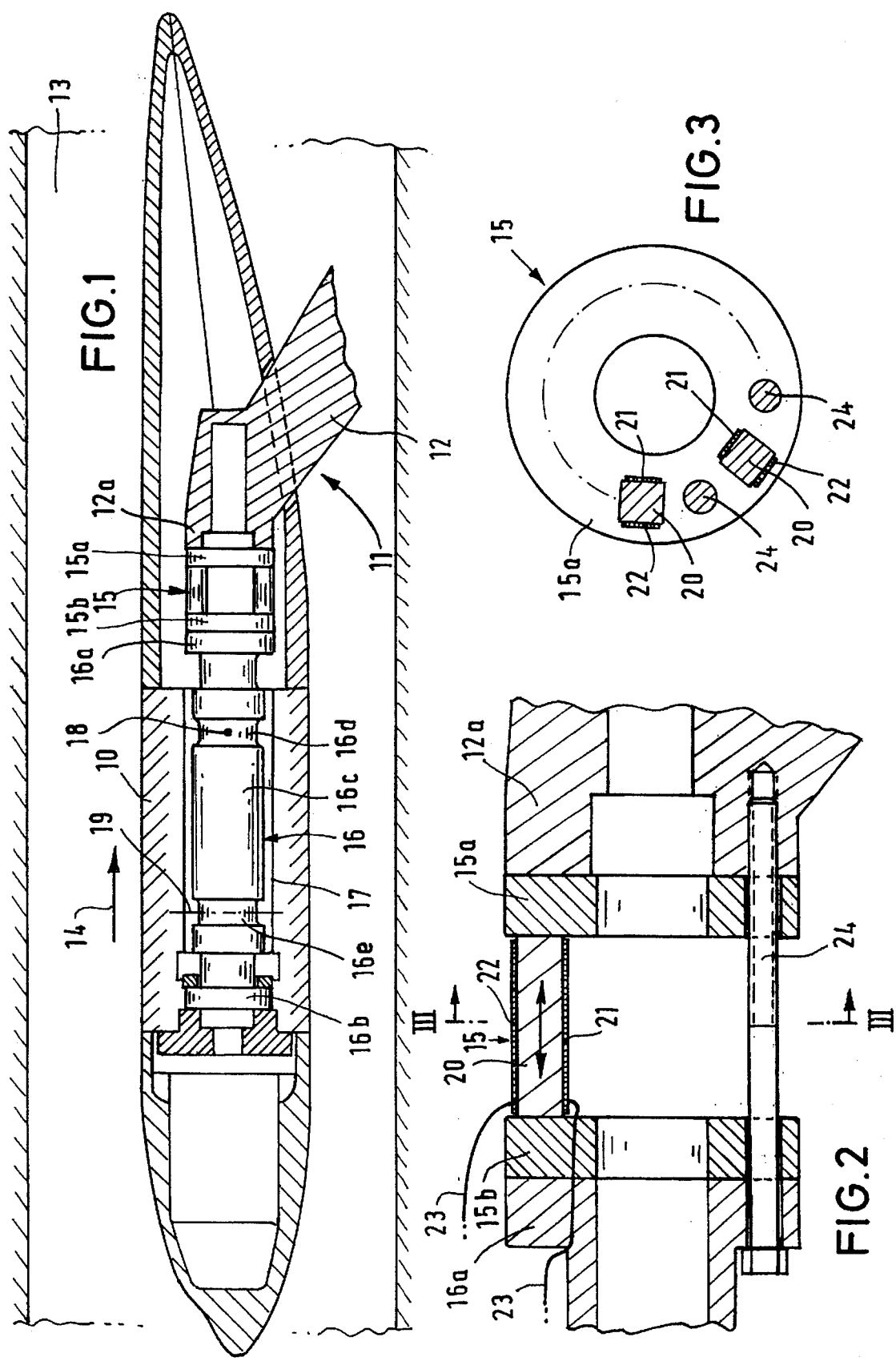

WIND TUNNEL MODEL SUPPORT WITH VIBRATION DETECTION BALANCE AND COUNTERVIBRATION MEANS

BACKGROUND OF THE INVENTION

Supports for wind tunnel models of the present type are known, e.g., from U.S. Pat. No. 4,658 635. In wind tunnels wherein models of aircraft or vehicles are tested for their aerodynamic properties, the model is supported in the air flow, by mounting it on a holding arm (often referred to as a sting) which typically penetrates the model body with minimum distortion to the geometric shape. To measure the aerodynamic forces acting on the model, a balance having several degrees of freedom is placed between the sting and the model. This allows the measurement of forces and moments acting on the model (such as drag, sideforce, lift, roll, pitch and yaw), which result from the flow over the model. The elements of the balance are subjected to elastic deformations which are measured by sensors, such as strain gauges and transformed into electric signals representing the respective forces and moments.

Since the wind tunnel model and the balance form an vibrating mass-spring system, the wind tunnel model experiences vibrations which can be excited by the flow and/or the model support. In this manner, longitudinal vibrations as well as torsional vibrations and flexural vibrations are generated.

In said model support known from U.S. Pat. No. 4,658635, the balance for measuring the above mentioned forces is mounted internally in the model. This balance is engaged by the sting which is fastened to a support which itself is supported in a fixed position. Thus, the overall model support comprises the balance, the sting and the support with all of these pans being arranged in series. The support can be excited from signals measured by sensors describing the movement of the model, so that counter vibrations to the resulting vibrations of the model are generated and vibration compensation is effected. The support according to the invention is a very complex structure having numerous degrees of freedom, each of them requiring a separate actuator. Internal balances adapted for mounting on the sting of a wind-tunnel model support, and also such balances provided with piezoelectric sensors, are known from German Patent 31 51 669 C3 and U.S. Pat. No. 4,938,059.

It is an object of the invention to provide a support for wind tunnel models which, due to a novel design of the counter vibration generator, can be given a small-sized and compact configuration.

SUMMARY OF THE INVENTION

In the model support according to the invention, the counter vibration generator comprises of several parallel force-generating elements arranged in the manner of an annular cage. These force-generating elements are provided as piezoelectric actuators. By suitable excitation of specific combinations of actuators, different vibrations of the wind runnel model can be generated. These can be, e.g., linear vibrations of the model in the longitudinal direction, torsional vibrations about the transverse horizontal pitching axis or torsional vibrations about the transverse vertical yawing axis, or combinations of these vibrations. A control unit is provided for receiving the supplied signals and producing there from exciting signals for the counter vibration generator. These counter vibration signals are selected and dimensioned to cause a compensation of the original vibration by the generated counter vibrations.

Another object of the invention resides in providing a support for wind tunnel models where the counter vibration generator needs to generate only relatively small vibration amplitudes.

According to this aspect of the invention, the counter vibration generator, controlled in dependence on deformations of the balance, is arranged in series with the balance, either between the sting and the balance or along the sting.

Thus, the counter vibration generator is in any case arranged near the balance which in turn carries the model. The sting or respectively the major portion thereof is fastened rigidly and is not subjected to the vibrations. The vibrating mass completely or substantially consists only of the model and the balance. Because of the resultant small mass, the counter vibration generator needs to generate only relatively small vibration amplitudes. The counter vibration generator is excited on the basis of the signals supplied by the balance or other sensors describing the movement of the model, to thus generate counter vibration to the occurring vibrations of the model so that a vibration compensation will take place.

The invention is generally suited for all types of wind tunnels and is particularly useful for wind tunnels designed for the testing of aircraft models. Also in wind tunnels operating at very low temperatures (cryogenic wind tunnels), use can be made of the counter vibration generators comprising the piezoelectric elements because these will work also at low temperatures.

BRIEF DESCRIPTION OF THE DRAWINGS

A preferred embodiment of the invention will be explained in greater detail hereunder with reference to the accompanying drawings.

FIG. 1 is a schematic lengthwise sectional view of an aircraft model fastened to a model support FIG. 2 is an enlarged view of the counter vibration generator, and FIG. 3 is a sectional view taken along the line III—III of FIG. 2.

DESCRIPTION OF A PREFERRED EMBODIMENT

Figure 4:
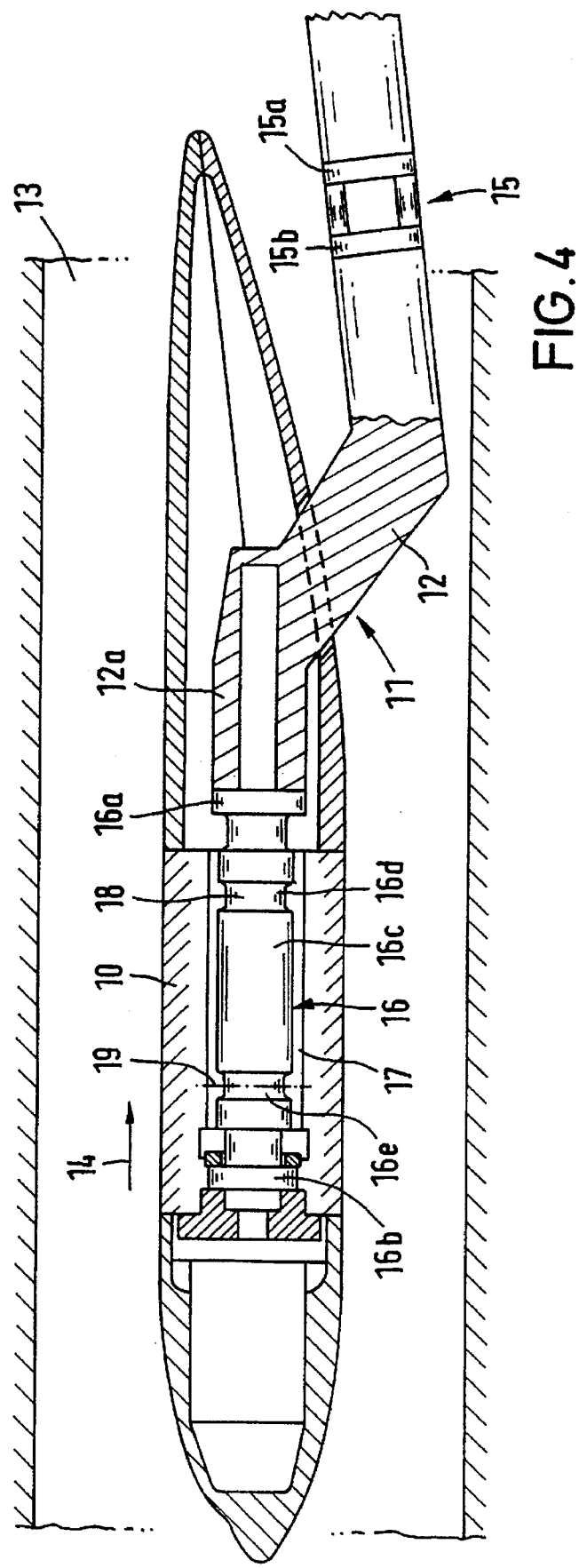
FIG. 4 is a schematic lengthwise sectional view of an aircraft model fastened to an alternative embodiment of a model support.

As illustrated in FIG. 1, a wind tunnel model 10 provided as an aircraft model is mounted on a model support 11. Model support 11 comprises a sting 12 projecting into the flow channel 13 in a cantilevered manner and being supported in a suitable manner. According to FIG. 1, the sting 12 is oriented obliquely to the flow direction 14 but alternatively can be arranged in parallel to the flow direction 14. The rear end (not shown) of sting 12 is attached on a stationary support base while the free end 12a is arranged within model 10. For this purpose, the model has an opening formed therein, with sting 12 extending there through. The counter vibration generator 15 has one end 15a fastened to end 12a of sting 12. A balance 16 with a holder 16a is mounted to the other end 15b of counter vibration generator 15. On the end of balance 16 opposite to the flow direction, a further holder 16b is provided for mounting the model 10 thereto. The complete balance 16 is accommodated in a cavity 17 of model 10 which is wide enough to allow deformation of the balance 16 in all directions Balance 16 consists of a central portion 16c deformable in a longitudinal direction, and two bending portions 16d and 16e, each permitting bending movements about both a horizontal axis 18 and a vertical axis 19, respectively. The individual portions of balance 16 have force sensors, typically strain gauges (not shown) attached thereto for measuring the respective deformations of these portions and supplying corresponding signals to an evaluation device. The evaluation device detects the forces acting on model 10 due to the flow. The various elements of balance 16 are elastic. Thus, the mass of model 10 together with balance 16 constitutes an vibrating mass spring system.

Counter vibration generator 15 serves for generating counter vibrations for compensating the vibrations of model 10. The configuration of counter vibration generator 15 is schematically illustrated in FIGS. 2 and 3. The ends 15a and 15b are formed by flange-like disks having rod shaped piezoelectric elements 20 extending there between. Each piezoelectric element 20 on opposite sides thereof is provided with electrodes 21, 22 connected to electric lines 23. The piezoelectric elements are arranged to form a cage. The piezoelectric elements 20 hold the ends 15a and 15b at a mutual distance, and tensioning elements 24 provided as threaded bolts extend between the elements 20. The tensioning elements 24 exert a prestress on the piezoelectric elements 20, thereby axially compressing them. The lines 23 of each piezoelectric element 20 can have a control voltage for the respective element 20 applied thereto. This makes it possible to separately drive the elements 20 of counter vibration generator 15 and thereby generate different vibration modes. Thus, for instance, mutually opposite elements 20 can be excited in mutually opposite senses to generate torsional vibrations. If all of the elements 20 are excited in an in phase manner, longitudinal vibrations will be generated.

The exciter voltages for the piezoelectric elements 20 are generated by a control unit which receives the signals from balance 16 or other sensors describing the movement of the model and, following predetermined conversion criteria, uses these signals to produce counter vibration signals for the counter vibration generator 15.

I claim:

1. A support for wind tunnel models, comprising a sting carrying an elastic balance for detecting, in several degrees of freedom, forces acting on the model, and a counter vibration generator provided in serial arrangement with the balance and being controlled on the basis of signals supplied by sensors detecting the movements of the model, wherein the counter vibration generator comprises a plurality of piezoelectric elements distributed about an axis and prestressed in a longitudinal direction by mechanical pressure, each of the piezoelectric elements having electrodes on opposite sides thereof for converting an applied voltage into a movement. whereby a plurality of different vibration modes are generatable.

2. A support for wind tunnel models, comprising a rigid sting having a first end and a second end, the first end of the sting being rigidly fastened to a stationary support, the sting carrying an elastic balance for detecting, in several degrees of freedom, forces acting on the model, and a counter vibration generator provided in serial arrangement with the balance and being controlled on the basis of signals supplied by sensors detecting the movements of the model wherein the counter vibration generator is arranged between the sting and the balance or between the first end of the sting and the second end of the sting.

* * * * *